(12) United States Patent
Pfefferle et al.

(10) Patent No.: US 6,485,624 B1
(45) Date of Patent: Nov. 26, 2002

(54) METHOD AND DEVICE FOR CAPACITATIVE DEMINERALIZATION OF LIQUIDS WHICH CONTAIN IONS

(76) Inventors: Uwe Pfefferle, Sindelsdorferstrasse 4, D-82392 Habach/Dürnhausen (DE); Alois Sitter, Schimmelstrasse 4, D-89415 Lauingen (DE)

( * ) Notice: Subject to any disclaimer, the term of this patent is extended or adjusted under 35 U.S.C. 154(b) by 0 days.

(21) Appl. No.: 09/744,525
(22) PCT Filed: Jul. 21, 1999
(86) PCT No.: PCT/DE99/02220
§ 371 (c)(1), (2), (4) Date: Apr. 9, 2001
(87) PCT Pub. No.: WO00/05175
PCT Pub. Date: Feb. 3, 2000

(30) Foreign Application Priority Data

Jul. 21, 1998 (DE) .......................... 198 32 822

(51) Int. Cl.[7] .................................. C02F 1/46
(52) U.S. Cl. ................. 204/518; 204/554; 204/627; 204/647; 204/660; 210/748
(58) Field of Search ................ 204/518, 554, 204/647, 660, 627; 210/748

(56) References Cited

U.S. PATENT DOCUMENTS

| 3,716,459 A | | 2/1973 | Salter et al. |
| 5,425,858 A | * | 6/1995 | Farmer ...................... 204/551 |

FOREIGN PATENT DOCUMENTS

| DE | 40 03 516 A1 | 8/1991 |
| DE | 44 21 608 A1 | 1/1996 |
| EP | 0 377 411 A2 | 7/1990 |

OTHER PUBLICATIONS

International Publication WO 98/17587 (Leiter et al..), dated Apr. 30, 1998.

* cited by examiner

Primary Examiner—Arun S. Phasge
(74) Attorney, Agent, or Firm—Laurence A. Greenberg; Werner H. Stemer; Ralph E. Locher

(57) ABSTRACT

The invention relates to a process and apparatus for the capacitive demineralization of liquids containing ions in which, after introducing the liquid into a container, an electric field is applied to capacitor plates (8, 9), which leads to ions of the liquid being conducted through a filter wall (7). The ions conducted through are deposited on the capacitor plates (8, 9) as bilayers (15, 16). By introducing pulsed voltage peaks, microcrystalline structures which result from ionic compounds are precipitated and then removed from the apparatus (1).

13 Claims, 2 Drawing Sheets

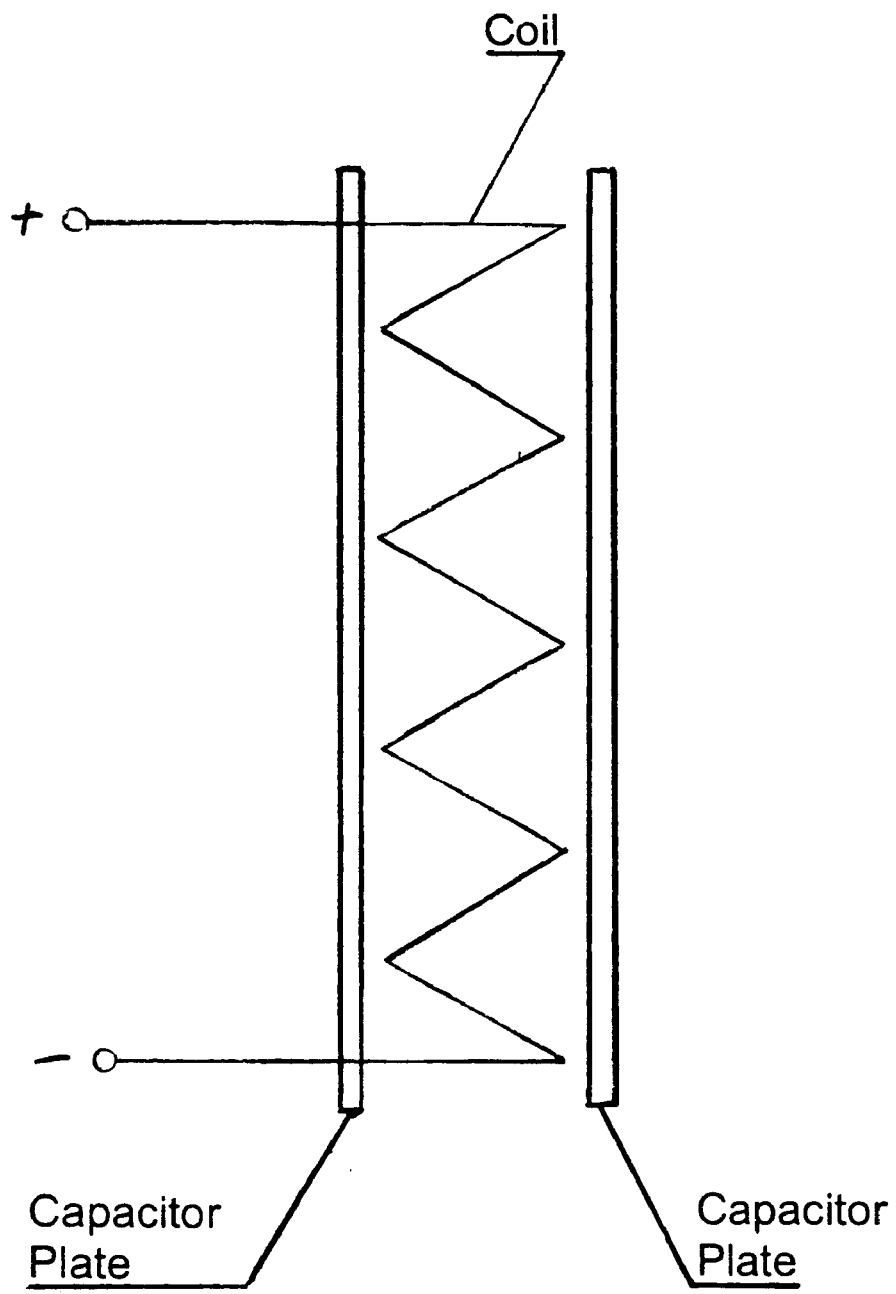

METHOD AND DEVICE FOR CAPACITATIVE DEMINERALIZATION OF LIQUIDS WHICH CONTAIN IONS

BACKGROUND OF THE INVENTION

Field of the Invention

The invention relates to a process and apparatus for the capacitive demineralization of liquids containing ions.

In the publication WO 98/17587, prior-art processes and apparatuses for water treatment, in particular demineralization and decarbonization, are described.

These are based on two fundamental process principles, one concerning decarbonization with cation-exchange resins in $H^+$ form and the other concerning decarbonization with precipitation of carbonates, especially lime.

The disadvantage of the known processes, in which the decarbonization is realized by raising the pH, is seen in this document in the fact that large quantities of chemical additives have to be admixed with the water. For example, the addition of lime milk introduces additional $Ca^{2+}$ ions into the water, which in the subsequent lime precipitation process cannot always be precipitated out completely. On the use of sodium hydroxide solution and soda in the drinking water sector, it is stated that the limit values for sodium ions set corresponding limits here.

A further problem is seen in the high pH of the water after the lime precipitation. Appropriate countermeasures have to be taken for this.

In the case of electrochemical processes as an alternative, it is regarded as a problem that it is important for the electrode reaction to be carried out at a voltage below the water decomposition voltage of 1.23 V, since otherwise $H^+$ ions form on the anode, and they would lower the pH again. As a result, the success of the process is restricted to the oxygen present in the water and its electrochemical conversion at the cathode.

To avoid these problems, it is proposed in WO 98/17587 to form the necessary $OH^-$ ions by electrolytic decomposition of water at the cathode. In this case, a diaphragm is to be used to prevent the $OH^-$ ions from recombining with $H^-$ ions formed at the cathode.

However, investigations carried out within the scope of the present invention have found that the known process and the corresponding apparatus are relatively complex in terms of control technology and process engineering to the extent that it is necessary to apply a voltage of higher than 1.22 V between the cathode and the anode, and wherein an alkaline environment in which carbonate and/or magnesium carbonate precipitates must be created in the cathode space which is created by introducing a diaphragm between the cathode and the anode.

SUMMARY OF THE INVENTION

It is therefore an object of the present invention to provide a process and apparatus for the capacitive demineralization of liquids containing ions which can be realized in a simple manner even on an industrial scale and permit a high level of efficiency.

According to the principles of the present invention, a configuration of highly capacitive electrodes, which preferably consist of a conductive material with an extremely large surface area, is used in a filter container with a filter wall or diaphragm wall. By applying an electric field, in a next process step the ions contained in the liquid are conducted through the filter wall of the filter container and form a so-called bilayer on the surface of the electrode.

After that, a series of pulsed voltage peaks are introduced into this bilayer, representing a supersaturated solution, which leads to the precipitation of microcrystalline structures resulting from ionic compounds. These microcrystalline structures can then be removed from the filter container.

For instance, it is possible to apply either a DC voltage field or an AC voltage field to the highly capacitive electrodes or capacitor elements. A closed cup-shaped filter wall surrounding the highly capacitive electrodes and with a pore size which largely prevents ingress of water but allows the ions having a hydration sheath to pass through is preferably used as the diaphragm wall or filter wall.

For removing the precipitated microcrystalline structures, suitable filtration methods or other retention methods may be used.

Other dissolved ions which cannot be precipitated by feeding the pulsed voltage peaks can be detached, preferably by suitable depolarization or polarity reversal of the capacitor elements or highly capacitive electrodes, and extracted from the medium by bonding on suitable surfaces or by pulsed rinsing operations.

Especially for industrial use, the apparatus according to the invention may preferably be constructed in a modular and meandering form, in order to increase the efficiency and make the polarization reversal possible without major electrical losses.

Further details, features and advantages of the invention emerge from the following description of an exemplary embodiment on the basis of the drawing, in which:

BRIEF DESCRIPTION OF THE DRAWINGS

FIG. 2 is a schematic view of a configuration having a coil disposed between capacitor plates.

DESCRIPTION OF THE PREFERRED EMBODIMENTS

Figure 1:
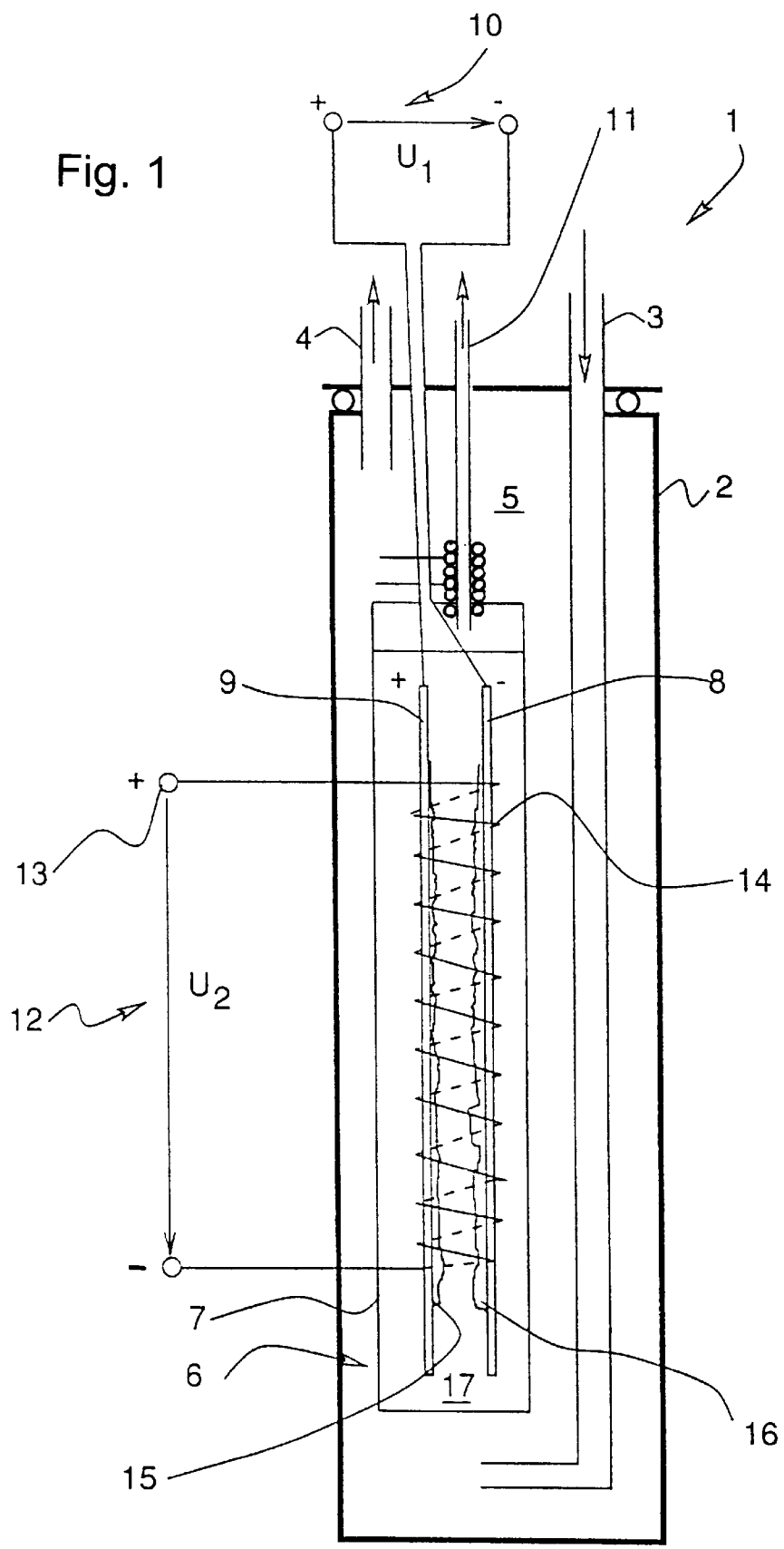
FIG. 1 is a schematic, greatly simplified basic representation of an apparatus according to the invention for the capacitive demineralization of liquids containing ions.

The figure shows an apparatus 1 which has in the embodiment represented an outer container 2 with an inlet 3 and outlet 4 for a liquid containing ions, which can be introduced into the interior space 5.

Arranged in the interior space 5 of the container 2 is a filter container 6. The filter container 6 has a filter/diaphragm wall 7. The filter container 6 encloses a treatment space 17, in which highly capacitive electrodes or capacitor elements, of which there are two in the case of the example, preferably in the form of capacitor plates 8, 9 having a very large surface area, are arranged at a distance from one another. If necessary, a diaphragm can also be arranged between the capacitor plates 8, 9.

The capacitor plates 8, 9 are electrically connected to a first voltage source 10.

The container 2 also has a pressureless outlet 11, through which precipitated microcrystalline structures can be removed from the treatment space 17 in a suitable way, for example by corresponding differential pressure conditions.

The figure also illustrates a generating device 12 for introducing voltage peaks into the space between the capacitor plates 8, 9. This generating device 12 has a voltage source 13 and, in the case of the example, a coil 14, which in the case of the embodiment represented in the figure is arranged around the capacitor plates 8, 9. Alternatively, it is also possible to introduce between the capacitor plates 8, 9 a core with a coil wound around it. Finally, it is also possible, by suitable control technology devices, for the capacitor plates 8, 9 to be used indirectly for generating and introducing voltage peaks. In principle, a plurality of coils and cores are also possible.

If a liquid containing ions is to be treated with the apparatus 1 according to the invention, firstly the liquid or the liquid medium is introduced into the interior space 5 of the container 2 via the inlet 3. After applying a voltage from the voltage source 10 to the capacitor plates 8 and 9, a migration of ions takes place through the diaphragm wall 7, which leads to the formation of two bilayers 15, 16 on the capacitor plates 8, 9. After applying a voltage U2 and the corresponding introduction of pulsed voltage peaks via the coil 14 into the bilayers 15, 16, forming locally supersaturated solutions, microcrystalline structures are precipitated and can be extracted through the use of special apparatuses, such as for example filtration apparatuses, via the pressureless outlet 11 of the apparatus 1. Ions which cannot precipitate can be extracted from the container by rinsing operations or by bonding on suitable surfaces.

What is claimed is:

1. A process for a capacitive demineralization of liquids containing ions, the method which comprises:

introducing a liquid into a container;

conducting ions through a filter wall by applying an electric field to capacitive capacitor elements disposed within the filter wall;

introducing, with a coil, pulsed voltage peaks into a supersaturated solution forming on the capacitive capacitor elements, for precipitating microcrystalline structures resulting from ionic compounds; and removing the microcrystalline structures.

2. The process according to claim 1, which comprises applying a DC voltage field.

3. The process according to claim 1, which comprises applying an AC voltage field.

4. The process according to claim 1, which comprises detaching and removing further highly soluble ions present in the supersaturated solution from the capacitive capacitor elements by polarizing the capacitive capacitor elements.

5. The process according to claim 1, which comprises detaching and removing further highly soluble ions present in the supersaturated solution from the capacitive capacitor elements by a polarity reversal of the capacitive capacitor elements.

6. An apparatus for a capacitive demineralization of a liquid containing ions, comprising:

a container formed with an interior space for receiving a liquid containing ions;

a filter container having a filter/diaphragm wall and defining with a treatment space, said filter container being disposed in the interior space of said container;

a capacitor element configuration disposed within the filter container; and a generating device having a coil, said generating device generating voltage peaks to be introduced into the treatment space defined by said filter container.

7. The apparatus according to claim 6, wherein said capacitor element configuration has two capacitive capacitor plates spaced apart from one another.

8. The apparatus according to claim 7, wherein said coil is provided around said capacitive capacitor plates.

9. The apparatus according to claim 7, wherein said coil is provided between said capacitive capacitor plates.

10. The apparatus according to claim 7, wherein said generating device includes a voltage source connected to said capacitor plates.

11. The apparatus according to claim 6, including an AC voltage field generating device connected to said capacitor element configuration.

12. The apparatus according to claim 6, including a DC voltage field generating device connected to said capacitor element configuration.

13. The apparatus according to claim 6, wherein said generating device includes a voltage source connected to said coil.

* * * * *